Aug. 16, 1966 J. M. TURICK 3,266,511

TRANSDUCER

Filed Oct. 11, 1963

INVENTOR
JOHN M. TURICK

BY Edward M. Farrell

ATTORNEY

United States Patent Office 3,266,511
Patented August 16, 1966

3,266,511
TRANSDUCER

John M. Turick, Chester, Pa., assignor to Sperry Rand Corporation, New York, N.Y., a corporation of Delaware Filed Oct. 11, 1963, Ser. No. 315,480
12 Claims. (Cl. 137—81.5)

The invention relates to multistable fluid devices of the wall attachment type, and more particularly to such a device in which electro mechanical means are used for switching.

In fluid multistable amplifiers of the prior art, the power stream is generally controlled by means of a fluid control stream or signal. The fluid control signal may originate in a fluid source such as connected fluid logic circuitry. Heretofore, if a control signal was not fluid but electrical, the control signal had to be converted into a fluid signal before it could be used by the fluid amplifier. It would be desirable to provide a fluid amplifier which is capable of responding directly to electrical signals for the switching of its fluid power stream.

It is an object of the invention to provide a fluid multistable amplifier adapted to be switched without use of a fluid control signal.

It is another object of the invention to provide a fluid multi-stable amplifier adapted to be switched by electrical control signals.

It is another object of the invention to provide a transducer capable of converting electrical signals into fluid signals.

It is another object of the invention to provide a fluid amplifier capable of converting electrical signals into amplified fluid signals.

According to the present invention a fluid amplifier is provided. Switching of the power fluid between a plurality of outlets is obtained by means of a piezo-electric element located along the path of flow of the power fluid. The deformation of the piezo-electric element caused by an applied electric field affects the pressure distribution in and along the power stream, causing it to switch from one output channel to the other, i.e., from one stable state to the other.

Figure 1A:
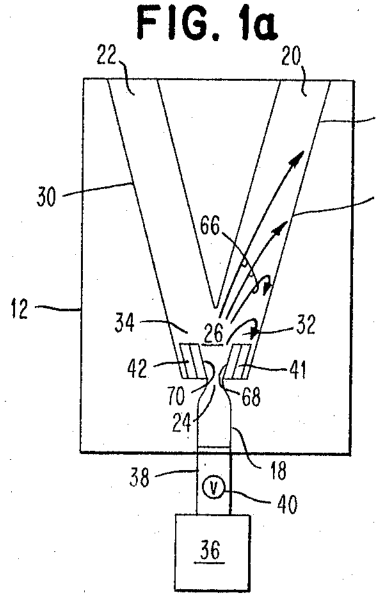
Figure 1B:
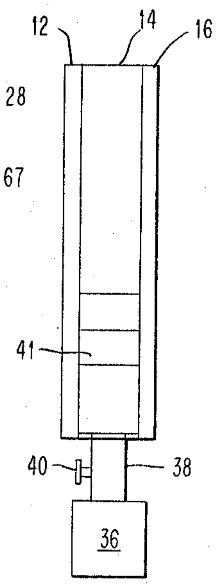
Figure 1C:
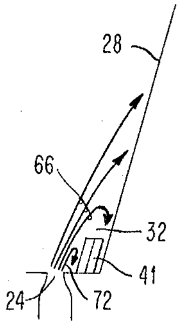
Figure 1D:
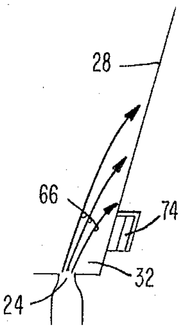
Figure 2A:
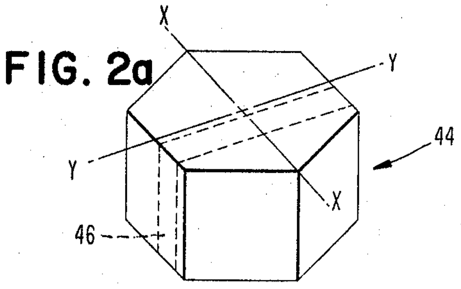
Figure 3A:
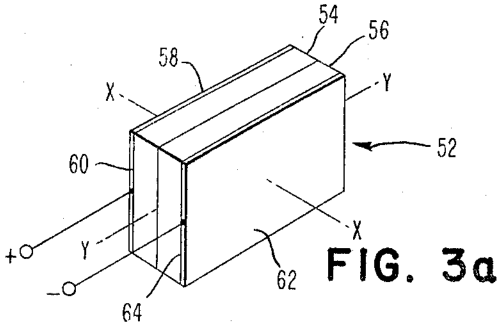
Figure 2B:
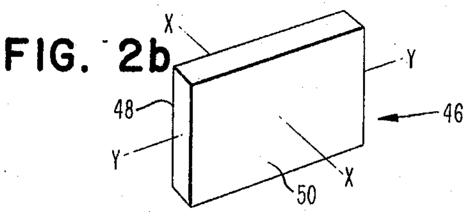
Figure 3B:
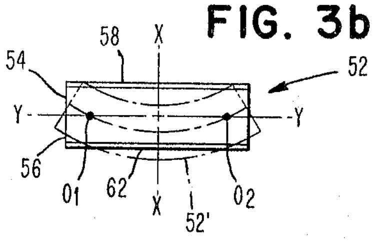
Figure 4:
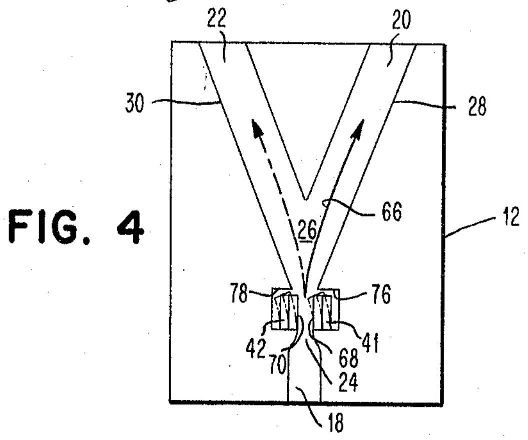

The above and still further objects, features and advantages of the invention will become apparent from the following description and the accompanying drawings, in which:

FIG. 1*a* illustrates a plan view of an embodiment of the device, according to the invention;

FIG. 1*b* illustrates a side-view of the device illustrated by FIG. 1*a*;

FIG. 1*c* illustrates a modified portion of the device illustrated by FIG. 1*a*;

FIG. 1*d* illustrates another modified portion of the device illustrated by FIG. 1*a*;

FIG. 2*a* illustrates a plan view of a typical piezo-electric crystal;

FIG. 2*b* illustrates a section cut from the crystal of FIG. 2*a*;

FIG. 3*a* illustrates an assembly comprising two sections similar to the one illustrated by FIG. 2*a*;

FIG. 3*b* illustrates the assembly illustrated by FIG. 4 in operating condition, and FIG. 4 illustrates a plan view of another embodiment of the device according to the invention.

Referring to the drawing, the fluid amplifiers illustrated are of the known planar construction, generally comprising three connected flat plates. The desired channel configuration is cut, etched or otherwise formed in the center plate. The channels in the center plate may be adapted to be connected to tubes or other suitable fluid conducting means. The center plate is covered on top and bottom with a solid plate. The plates are screwed or bonded together to form a substantially solid body.

The amplifier illustrated by FIGS. 1*a* and 1*b* comprises three flat plates 12, 14 and 16 fluid-tightly bonded together. For the purpose of illustration, the plates have been shown as made of a transparent material, such as a clear plastic.

The center plate 14 includes a power fluid inlet 18, two power stream outlets 20 and 22, and a nozzle 24 permitting fluid to flow from inlet 18 to either inlet 20 or 22. The outlet channels 20 and 22 intersect to form an interaction chamber 26. The chamber is bounded by side walls 28 and 30 which are off-set from the edge of nozzle 24. The off-set walls 28 and 30 provide for off-set regions 32 and 34 respectively.

The power fluid inlet 18 is connected to a source 36 of fluid under pressure, via a tube 38. The fluid under pressure may be air or a gas, or water or other liquid. Gases with solid or liquid particles entrained therein have been found to work very satisfactorily. A fluid flow regulating device, such as a valve 40, may be used in conjunction with the fluid source 36 so as to insure a constant flow of fluid at a desired pressure. Such fluid regulating device may be of conventional construction.

In each off-set region 32 and 34 of the interaction chamber is located a piezo-electric element 41 and 42 respectively. Each piezo-electric element may be of the so-called flexural type, also called a Curie strip (see for example W. G. Cadey, Piezo-Electricity, McGraw-Hill, 1946), as will be explained later on. Each element is mounted near its base so that it is capable of flexing in the direction of the power stream flowing through the interaction chamber when an electric field is applied thereto.

The piezo-electric effect is well known. In general, the piezo-electric effect is that characteristic exhibited by certain crystals, for example crystals of quartz or Rochelle salt, whereby an electrical field applied along the $x$-axis or electrical axis of the crystal produces a mechanical stress along the $y$-axis or mechanical axis of the crystal. Dependent on the polarity of the electric field with respect to the crystal, the mechanical stress is extensional causing elongation, or compressional causing contraction of the crystal.

To better understand the operation of a Curie strip, reference is made to FIGS. 2*a*, 2*b*, 3*a*, and 3*b*. FIG. 2*a* shows in perspective the hexagonal form of a natural quartz crystal 44. By convention, the axes passing through the corners of the hexagonal plane of the crystal are called electrical or X-axes, the axes perpendicular to the faces of the hexagon are called the mechanical or Y-axes. In FIG. 2*a* only one electrical and one pertaining mechanical axis is shown. An electric field applied along an X-axis results in a mechanical stress along the pertaining Y-axis, i.e. the axis which is perpendicular to the X-axis.

If a flat section or strip is cut from this crystal with its large faces perpendicular to an X-axis, the strip is called an X-cut strip or an X-cut crystal. FIG. 2*b* illustrates an X-cut strip, indicated by numeral 46. Its two parallel faces 48 and 50 are perpendicular to the X-axis of the crystal of FIG. 2*a*. If an electric field is applied across the faces 48 and 50, the polarity on face 48 being positive, that on face 50 negative, a compression of the strip in the Y-direction results. If the crystal is turned around in the field, so that its face 50 faces the positive polarity and face 48 faces the negative polarity, the crystal elongates. The result in the latter case, could, of course, have been obtained by reversing the polarities on the faces 48 and 50, maintaining the crystal in its original position.

Of the above properties use is made in a Curie strip. A Curie strip is an assembly of two X-cut crystals oriented oppositely with respect to each other, as explained above. FIG. 3*a* illustrates a Curie strip, indicated by numeral 52. The assembly comprises two crystals 54 and 56. Crystals 54 and 56 are X-cut crystals, similar to crystal 46 of FIG. 2*b*, cemented together in opposite orientation, for example, by means of Canada balsam. The orientation of crystal 54 is the same as that of crystal 46 in FIG. 2*b*; the orientation of crystal 56 is opposite to that of crystal 54. An electrode, for example, a film of silver 58 covers one outer face 60 of crystal 54. A similar electrode 62 covers the face 64 of crystal 56.

When an electrical potential with polarities as shown (FIG. 3*a*) is applied to both electrodes 58 and 62, i.e. when a positive electric charge is placed on face 60 and an equal negative charge on face 64 of crystals 54 and 58 respectively, crystal 54 becomes compressed, whereas crystal 56 becomes elongated. A bending moment results, causing a flexure of the assembly 52 as a whole in the direction of the arrow.

It will be understood that the Curie strip must be free to flex. In order that this condition shall be fulfilled it is necessary that any mounting which supports the strip shall not restrict its movement or at most the effect shall be as negligible as possible. In the known type of vibrations of crystals it is noticed in all cases that there are nodal points. These points, by definition, are points of zero motion. They are isolated points, or lines of very small size, in comparison with the total crystal area. The obvious type of mounting is the one which simply clamps the crystal with a very small area at these points or nodes. The area of the clamp is best determined experimentally by reducing it until, with sufficient pressure to hold the crystal, the damping of the crystal is minimal. In a Curie strip the nodal region is substantially a nodal line and therefore may permit use of a knife-edge type of mounting instead of a single point mounting.

FIG. 3*b* illustrates the Curie strip of FIG. 3*a* in a flexed condition. It will be understood that where the neutral plane of the bent assembly 52' intersects with the Y-plane of the unbent assembly 52, nodal lines occur. In FIG. 3*b* these nodal lines are seen to pass through the nodal points, $O_1$ and $O_2$ and perpendicular to the plane of the drawing. Thus, a clamping of the assembly 52 substantially in the region of the nodal line passing through nodal points $O_1$ permits the assembly to flex freely about this line and in the plane of the drawing.

Referring back to FIG. 1*a*, fluid flowing from source 36, entering the device through inlet 18 is assumed to be at a certain pressure above atmospheric pressure. As the stream of fluid is reduced in cross-sectional area by the nozzle of fluid its velocity increases. The stream 66 of cross-sectional area leaving nozzle 24 and entering chamber 26 is called the power stream of the device. Due to the off-set regions, 32 and 34 power stream 66 will be enhanced to lock onto either of the walls 28 or 30 in accordance with the well-known attachment phenomenon. According to this phenomenon, when there are walls near a directed fluid stream the entrainment of ambient fluid from the zones between the stream and the walls reduces the pressure in these zones. The stream wanders towards that wall where the pressure happens to be lowest at a given moment until it touches that wall. With the region between the stream and the wall now being cut off from supply from the ambient, its pressure becomes still lower and the fluid stream becomes stable in the attached position or "locked on." The point of attachment is also called the stagnation point of the fluid stream.

Assume for the purpose of explanation that the power stream 66 is locked on wall 28 of chamber 26. The power stream flows along wall 28 and leaves the device through outlet 20 of the chamber. The power stream is seen to flow substantially parallel to the flow surface 68 of piezo-electric 41 and is undisturbed thereby.

If an electric potential is applied to the element 41, it will flex as explained above, displacing its flow surface 68 in the direction of the power stream 66. It will be understood that if the flow surface 68 flexes toward the boundary of the power stream, the pressure of the power stream on the flow surface increases so that the pressure in the power stream adjacent the flow surface increases. It can be shown that the pressure exerted on a flow surface by a fluid stream is proportional to the sine of the angle between the flow surface and the fluid stream. Thus, the further the flow surface of the piezo-electric element flexes toward the power stream the higher the local pressure in the boundary of the power stream becomes.

At a certain moment, the pressure in the power stream adjacent the flow surface 68 will exceed and overcome the lock-on forces between the power stream and the wall 28. At this moment the power stream leaves wall 28, and switches over to and locks onto wall 30. If the field applied to the piezo-electric element is terminated, the piezo-electric element flexes back to its quiescent position; however, the power stream stays locked in its new position on wall 30 and flows out of outlet 22.

In order to switch the power stream back to outlet 20, the other piezo-electric element 42 must be excited by the application of an electric field, so that now the flow surface 70 of this element interacts with the power stream in the same manner as described above.

The piezo-electric elements may be located with respect to the nozzle such that additional off-set regions are created between the nozzle and the flow surfaces of the piezo-electric elements. In FIG. 1*c* which illustrates a modified portion of the device of FIG. 1*a*, the piezo-electric element 41 is off-set such that an off-set region 72 results. The addition of the off-set region 72 to the off-set region 32 provides for a stronger lock-on effect and thus enhances the stability of the device.

More effective control of the power stream may be obtained by locating the piezo-electric control elements in the region of attachment of the power stream to the wall. As is known from fluid dynamic theory, a fluid stream is least stable at and near its stagnation point and small disturbances in the pressure distribution at this point may change the flow pattern of the stream radically. With reference to FIG. 1*d*, when a piezo-electric element 74, mounted substantially flush with wall 28 in or near the stagnation point 67, is excited electrically so as to flex in the direction of the power stream. The resulting pressure disturbance will cause the power stream to move away from this wall and switch over to the opposite wall of the device. Generally, the location of the piezo-electric element 74 may be located 3 or 4 exit nozzle widths downstream.

The piezo-electric control elements need not necessarily be located in the interaction chamber of the device. FIG. 4 illustrates an embodiment, according to the invention, in which the piezo-electric elements are located in the nozzle. In FIG. 4 like parts are indicated by the same numerals as in FIG. 1*a*. On either side of nozzle 24 recesses 76 and 78 are provided in which the piezo-electric elements 41 and 42 are located. The piezo-electric elements are mounted such that their flow surfaces 68 and 70 respectively are coplanar with the walls of the nozzle. As explained above, if an electric potential is applied to, for example, element 41, this element will flex in the direction of the power stream 66 flowing through the nozzle and cause deflection of the power stream toward output channel 22. A more efficient deflection of the power stream may be obtained when both piezo-electric elements 41 and 42 are used simultaneously for a switching action. This may be obtained by exciting both elements simultaneously, and with electric field of such polarity that both elements 41 and 42 flex in the same direction. For example, in FIG. 4, the dotted lines indicate a flexing of both piezo-electric elements toward the left. The result is a movement of the nozzle opening 25 to the left, causing the power stream to leave outlet 20 and flow into outlet 22.

Reversal of the polarity of the fields applied to both piezo-electric elements causes their flow surfaces to move toward the right, switching the power stream back to outlet channel 20.

Although the invention has been described in connection with piezo-electric means, it is understood that magnetostrictive elements and other mechanical elements which are deflectable upon the application of an electrical control signal thereto, may be employed in place of the piezo-electric elements in many cases.

It will be further understood that modification, and variations may be effected without departing from the scope of the invention. For example, although the piezo-electric control elements have been described as of the Curie type, other piezo-electric control elements may be used. It is known, for example, that also a single piezo-electric crystal may be caused to flex under the influence of an electrical field. This is a matter of proper arrangement of the electrodes on the crystals and applying potentials of proper polarity thereto. Various electrode arrangements are shown in the above cited text. Still other piezo-electric elements may be used, for example, the so-called bimorphs of Sawyer (see the above cited text). In the bender type bimorphs, the crystal plates are cut and arranged such with respect to their axes that an applied electrical field tends to make one plate longer and narrower, the other plate shorter and wider. As a result, the element as a whole tends to become saddle-strapped. With proper clamping of the plate assembly, it may be caused to vibrate like a diaphragm.

Further, although the device illustrated and described is basically of planar construction, a device according to the invention may have a third dimension of substantial magnitude. Further, the number of power stream inlets, interaction chambers, control elements and power stream outlets may be varied as a specific application of the device may require.

The embodiments of the invention in which an exclusive property or privilege is claimed are defined as follows:

1. A fluid device comprising an inlet, a plurality of outlets, a source of power fluid, an electro-mechanical transducer made of material whose physical dimension changes in response to the application of an electrical field to said transducer to selectively extend the downstream end of said transducer into said power fluid to selectively deflect said power fluid to one of said outlets, and means for applying an electrical field to said electro-mechanical transducer.

2. The device of claim 1 wherein said electro-mechanical transducer comprises a piezo-electric element.

3. A fluid multi-stable device comprising a power stream inlet, a chamber having a plurality of outlets, a nozzle to permit a stream to flow from said inlet to a selected one of said outlets via said chamber, said chamber having two walls, each of said walls being offset with respect to said nozzle to form an off-set region within said chamber, a piezo-electric element in each of said off-set regions, each piezo-electric element having a flow surface which is substantially parallel with said power stream in the quiescent position of said piezo-electric element, said piezo-electric element being adapted to change its physical dimensions upon the application of an electric field from said quiescent position toward said power stream to thereby deflect said power stream into the selected one of said outlets.

4. The invention as set forth in claim 3, wherein said piezo-electric element comprises an assembly of two X-cut crystal strips cemented together and oriented with respect to the electric field so that one strip becomes elongated and the other contracts upon application of the electric field resulting in a flexure of both strips.

5. The invention as set forth in claim 3 wherein each of said piezo-electric elements is located in an off-set region such that a second off-set region results between said nozzle and the flow surfaces of said piezo-electric elements.

6. The invention as set forth in claim 3, wherein said piezo-electric elements are located within said nozzle such that said flow surface is substantially flush with the walls of said nozzle.

7. The invention as set forth in claim 3 wherein said piezo-electric elements are located in a recess in each of said walls such that said flow surface is substantially flush with the wall, and said recesses being located substantially at the stagnation points of said power stream with respect to said walls.

8. A fluid multi-stable device comprising a power stream inlet, a plurality of outlets, a nozzle to direct said power stream from said inlet to a selected one of said outlets, walls associated with said outlets, each of said walls being off-set with respect to said nozzle to form an offset region, a piezo-electric element in each of said off-set regions, each piezo-electric element having a flow surface which is substantially parallel with said power stream in the quiescent position and said piezo-electric element, said piezo-electric element being capable of changing its physical dimensions as a result of an application of an electric field thereto from said quiescent position to deflect said power stream into a selected one of said outlets, and means for applying an electric field to said piezo-electric element.

9. The invention as set forth in claim 8 wherein two or more signals are simultaneously applied to two or more said piezo-electric elements to cause said elements to be deflected in the same direction whereby said power stream is directed to a selected outlet dependent upon the direction of deflection of said elements.

10. The invention as set forth in claim 8, wherein said piezo-electric elements are located in a recess in each of one of said walls such that said flow surface is substantially flush with the wall, said piezo-electric elements beng located at the stagnation points of said power stream with respect to said walls.

11. The invention as set forth in claim 10 wherein said piezo-electric elements are of the flexural type.

12. The invention as set forth in claim 11 wherein said piezo-electric elements are Curie strips.

References Cited by the Examiner

UNITED STATES PATENTS

| | | | |
|---|---|---|---|
| 3,071,154 | 1/1963 | Cargill et al. | 137—81.5 |
| 3,148,691 | 9/1964 | Greenblott | 137—81.5 |
| 3,168,897 | 2/1965 | Adams et al. | 137—81.5 |
| 3,182,686 | 5/1965 | Zilberfarb | 137—81.5 X |

FOREIGN PATENTS

| | | |
|---|---|---|
| 1,083,607 | 6/1960 | Germany. |

M. CARY NELSON, *Primary Examiner.*

S. SCOTT, *Assistant Examiner.*